United States Patent [19]

Ikemoto et al.

[11] Patent Number: 5,162,995
[45] Date of Patent: Nov. 10, 1992

[54] HYDRAULIC ACTIVE SUSPENSION SYSTEM FOR A VEHICLE PERFORMING VEHICLE HEIGHT FEEDBACK CONTROL

[75] Inventors: Hiroyuki Ikemoto, Susono; Shuuichi Buma; Toshio Aburaya, both of Toyota; Takashi Yonekawa, Mishima; Toshio Onuma, Susono; Tsukasa Watanabe; Toshiaki Hamada, both of Toyota, all of Japan

[73] Assignees: Toyota Jidosha Kabushiki Kaisha; Aisin Seiki Kabushiki Kaisha, both of Japan

[21] Appl. No.: 505,365

[22] Filed: Apr. 6, 1990

[30] Foreign Application Priority Data

Apr. 14, 1989 [JP] Japan .................................. 1-94586

[51] Int. Cl.⁵ .............................................. B60G 17/00
[52] U.S. Cl. ................................ 364/424.05; 280/707; 280/840
[58] Field of Search .................. 364/424.05; 280/707, 280/840, DIG. 1

[56] References Cited

U.S. PATENT DOCUMENTS 4,821,191  4/1989  Ikemoto et al. .................. 280/707
4,924,393  5/1990  Kurosawa ...................... 364/424.05
5,013,067  5/1991  Mine et al. .......................... 280/707
5,042,834  8/1991  Yonekawa et al. ................. 280/707
5,043,893  8/1991  Aburaya et al. ............... 364/424.05

Primary Examiner—Gary Chin
Attorney, Agent, or Firm—Oliff & Berridge

[57] ABSTRACT

In a hydraulic active suspension system, a plurality of actuators having working fluid chambers are provided corresponding to the vehicle wheels. Each actuator is adapted to increase and decrease vehicle height in response to the pressure within its working chamber, which is controlled by a pressure control device. Vehicle speed and vehicle heights at the locations corresponding to the vehicle wheels are detected by corresponding sensors. A control device is further provided for controlling the pressure control device so that the pressures within the working fluid chambers are driven to substantially the desired pressures, the desired pressures determined by, at least, the sum of the first control parameters corresponding to the differences between the actual vehicle heights detected and the associated desired vehicle heights and the second control parameters corresponding to the changing amounts of the vehicle height differences. The second control parameters are so set that the higher the vehicle speed is, the higher the second quantities are in magnitude, enhancing the controllability and stability of the vehicle under higher vehicle speed conditions and ensuring a greater comfortability level of the vehicle under lower vehicle speed conditions.

9 Claims, 12 Drawing Sheets

FIG. 6B

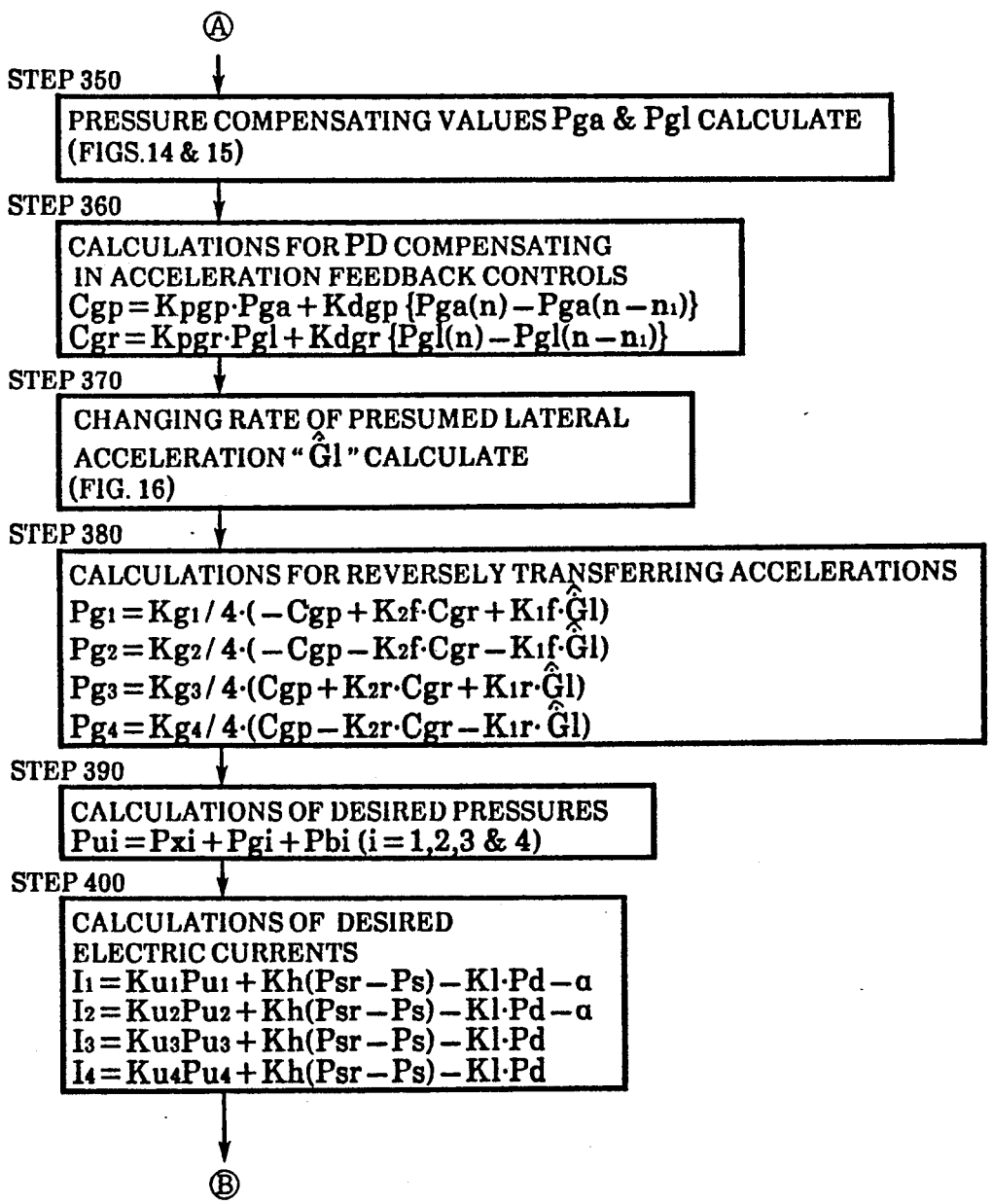

Ⓐ

STEP 350
PRESSURE COMPENSATING VALUES Pga & Pgl CALCULATE
(FIGS. 14 & 15)

STEP 360
CALCULATIONS FOR PD COMPENSATING
IN ACCELERATION FEEDBACK CONTROLS
$Cgp = Kpgp \cdot Pga + Kdgp \{Pga(n) - Pga(n-n_1)\}$
$Cgr = Kpgr \cdot Pgl + Kdgr \{Pgl(n) - Pgl(n-n_1)\}$ STEP 370
CHANGING RATE OF PRESUMED LATERAL
ACCELERATION "$\hat{G}l$" CALCULATE
(FIG. 16)

STEP 380
CALCULATIONS FOR REVERSELY TRANSFERRING ACCELERATIONS
$Pg_1 = Kg_1/4 \cdot (-Cgp + K_{2f} \cdot Cgr + K_{1f} \cdot \hat{G}l)$
$Pg_2 = Kg_2/4 \cdot (-Cgp - K_{2f} \cdot Cgr - K_{1f} \cdot \hat{G}l)$
$Pg_3 = Kg_3/4 \cdot (Cgp + K_{2r} \cdot Cgr + K_{1r} \cdot \hat{G}l)$
$Pg_4 = Kg_4/4 \cdot (Cgp - K_{2r} \cdot Cgr - K_{1r} \cdot \hat{G}l)$ STEP 390
CALCULATIONS OF DESIRED PRESSURES
$Pu_i = Px_i + Pg_i + Pb_i$ (i = 1, 2, 3 & 4)

STEP 400
CALCULATIONS OF DESIRED
ELECTRIC CURRENTS
$I_1 = Ku_1 Pu_1 + Kh(Psr - Ps) - Kl \cdot Pd - \alpha$
$I_2 = Ku_2 Pu_2 + Kh(Psr - Ps) - Kl \cdot Pd - \alpha$
$I_3 = Ku_3 Pu_3 + Kh(Psr - Ps) - Kl \cdot Pd$
$I_4 = Ku_4 Pu_4 + Kh(Psr - Ps) - Kl \cdot Pd$

Ⓑ

HYDRAULIC ACTIVE SUSPENSION SYSTEM FOR A VEHICLE PERFORMING VEHICLE HEIGHT FEEDBACK CONTROL

BACKGROUND OF THE INVENTION

1. Field of the Invention

The present invention relates to a hydraulic active suspension system for a vehicle such as an automobile or the like, and, more particularly, relates to a hydraulic active suspension system which effects vehicle height feedback control.

2. Prior Art

In a vehicle such as an automobile or the like, under the same conditions of external turbulences, such as, for example, lateral wind gusts exerted on a vehicle body, load surface undulations, inertial forces and the like, the behaviour of the vehicle body varies according to vehicle speed. That is, as the vehicle speed increases, the behaviour of the vehicle body becomes increasingly variable and the controllability and stability of the vehicle decreases.

In this connection, in the Japanese Utility Model Laying Open Publication No. Showa 62-185608 (1987), an active suspension system is described in which desired vehicle heights are set so that during a turn the desired roll angle of the vehicle body relative to its lateral acceleration is lowered in magnitude, as the vehicle speed increases.

In such an active suspension system as mentioned above, however, since the desired vehicle heights are set so that during a turn the desired roll angle relative to its lateral acceleration is lowered in magnitude as the vehicle speed increases, the same effect can be produced in a suspension system which uses vehicle height feedback control based upon a component proportional to the difference between a desired and an actual vehicle height and a component proportional to an integral value of the actual vehicle height. In such a system the coefficients for the two components are raised as the vehicle speed increases, and accordingly, the vehicle mode attitude feedback control tends to become unstable, causing hunting of the vehicle mode attitudes.

SUMMARY OF THE INVENTION

The present invention takes into consideration the problem associated with the above described conventional active suspension system which performs the feedback control based upon the vehicle mode attitudes, and has as its object the provision of a hydraulic active suspension system which is improved to enhance the controllability under higher vehicle speed conditions without comprising the comfortability of the vehicle under lower vehicle speed conditions, and to prevent the unstable control and the hunting due to this from occurring.

The above mentioned object is accomplished, according to the present invention, by a hydraulic active suspension system for a vehicle having a vehicle body and vehicle wheels comprising:

a plurality of actuators each being provided between said vehicle body and an associated vehicle wheel and adapted to increase and decrease vehicle height in response to the pressure within a working fluid chamber;

a means for controlling the pressures within said working fluid chambers;

a means for detecting vehicle speed;

means for detecting the vehicle heights at the locations corresponding to said vehicle wheels; and a control means for controlling said pressure control means so that the desired pressure within each said working fluid chamber is determined by, at least, the sum of a first control parameter corresponding to the difference between the actual vehicle mode attitudes and the associated desired vehicle mode attitudes and a second control parameter corresponding to the rate of change of said vehicle mode attitude differences;

wherein said second control parameter is set so that as the vehicle speed detected by said vehicle speed detecting means increases, said second control parameter is increased in magnitude.

According to the above mentioned construction, the pressures within the working fluid chambers in the actuators are so controlled that they may be their desired pressures determined by the sum of the first controlling quantities corresponding to the differences between the actual vehicle mode attitudes and the associated desired vehicle heights and the second controlling quantities corresponding to the changing amounts of the vehicle mode attitudes differences, and the second controlling quantities are so set that the higher the vehicle speed is, the higher the second quantities may be in magnitude.

Therefore, as the vehicle speed increases, the effectiveness of suppressing the rapid change of vehicle heights increases, enhancing the controllability and the stability of the vehicle under higher vehicle speed conditions, and the controlling amounts of the vehicle height feedback control for transitional changes of the vehicle heights do not become excessively higher under lower vehicle speed conditions, which allows to ensure better comfortability of the vehicle.

Since the first controlling quantities are not changed but the second controlling quantities are solely raised in magnitude, the controlling amounts of the vehicle height feedback control do not become too high under steady state running conditions where the vehicle heights normally change within smaller ranges, which makes it possible to avoid the excessive control and the hunting of the desired vehicle mode attitudes due to this from occurring.

The present invention is now described in terms of preferred embodiment thereof with reference to the attached drawings.

BRIEF DESCRIPTION OF THE DRAWINGS

In the accompanying drawings:

FIGS. 6A through 6C are flow charts showing the subroutine of the calculations for the active control carried out in the step 110 in the flow chart shown in FIG. 3;

DESCRIPTION OF THE PREFERRED EMBODIMENT

Figure 1:
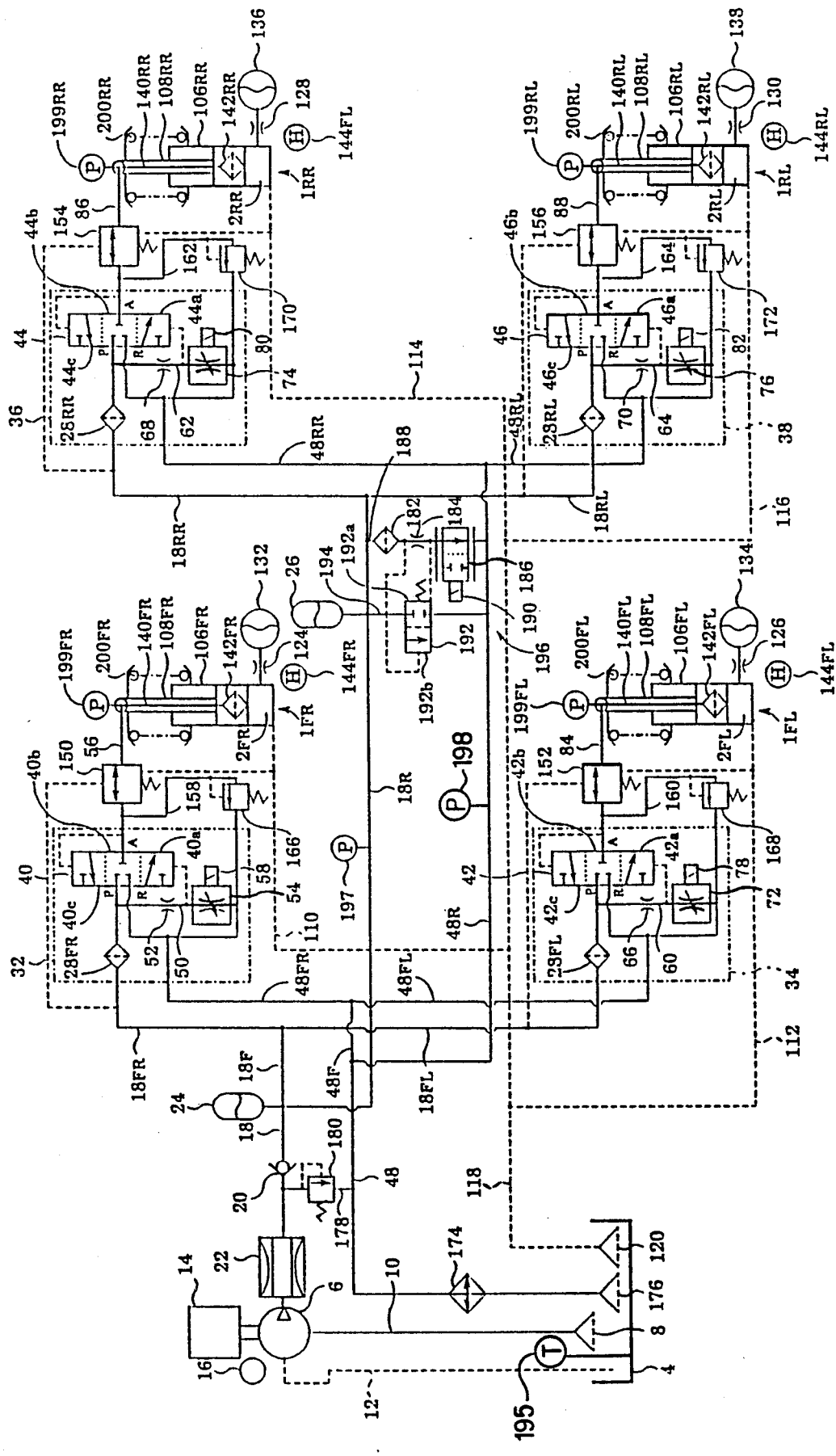
FIG. 1 is a schematic diagram showing major physical components of the preferred embodiment of the hydraulic active suspension system according to the present invention.

Referring to the drawings, FIG. 1 is a schematic diagram showing major physical components of the preferred embodiment of the hydraulic active suspension system of the present invention. The suspension system shown in FIG. 1 includes actuators 1FR, 1FL, 1RR and 1RL provided corresponding to front right, front left, rear right and rear left vehicle wheels, not shown, respectively, and these actuators have therein working fluid chambers 2FR, 2FL, 2RR, and 2RL, respectively.

In the figure, 4 designates a reserve tank which contains oil serving as working fluid, and the tank 4 is fluidly connected to the suction side of a pump 6 by a suction flow line 10 having therein a filter 8 for removing any foreign matter from oil. To the pump 6 is connected a drain line 12 which collects the oil leaking within the pump and returns it to the reserve tank 4. The pump 6 is drivingly connected with and rotationally driven by an engine 14, the rotational speed of which is detected by a rotational speed sensor 16.

A high pressure flow line 18 is connected with the discharge side of the pump 6. A check valve 20 is incorporated in the high pressure flow line 18, which permits only the flow of oil in the direction from the pump 6 towards the actuators, and between the pump 6 and the check valve 20 is provided an attenuator 22 which serves to absorb or dampen the pressure pulsation of the oil discharged from the pump, thereby reducing the pressure variation. The high pressure flow line 18 is connected to a high pressure flow line 18F for the front vehicle wheels and a high pressure flow line 18R for the rear vehicle wheels, to which are connected accumulators 24 and 26, respectively. These accumulators contain therein pressurized gas and serve to absorb pressure variation of the oil and to accumulate pressure. A high pressure flow line 18FR for the front right vehicle wheel and a high pressure flow line 18FL for the front left vehicle wheel are connected to the high pressure flow line 18F, while a high pressure flow line 18RR for the rear right vehicle wheel and a high pressure flow line 18RL for the rear left vehicle wheel are connected to the high pressure flow line 18R. The high pressure flow lines 18FR, 18FL, 18RR and 18RL have therein filters 28FR, 28FL, 28RR and 28RL, respectively, and lines are connected respectively to ports P of pilot-operated three-port switching control valves 40, 42, 44 and 46 included in pressure control valves 32, 34, 36 and 38, respectively.

The pressure control valve 32 comprises the switching control valve 40, a flow line 50 fluidly communicating the high pressure flow line 18FR and a low pressure flow line 48FR for the front right vehicle wheel with each other, a fixed flow restrictor 52 and a variable flow restrictor 54 both provided in the flow line 50. The switching control valve 40 has, in addition to the port P, ports R and A which are connected with low pressure flow line 48FR and a connecting flow line 56, respectively. The switching control valve 40 may be a spool type valve adapted to take in as pilot pressures the pressure Pp within the flow line 50 between the flow restrictors 52 and 54 and the pressure Pa within the connecting flow line 56, and is shifted between a first switching position 40a wherein it fluidly communicates the ports P and A with each other when the pressure Pp is substantially higher than the pressure Pa, a second switching position 40b wherein it cuts the communication among all the ports when the pressure Pp and Pa are substantially equal to each other, and a third switching position 40c wherein it fluidly communicates the ports R and A with each other when the pressure Pp is substantially lower than the pressure Pa. The variable flow restrictor 54 is adapted to vary its effective flow area by means of the electric current supplied to a solenoid 58 to cooperate with the fixed flow restrictor 52 to variably control the pilot pressure Pp.

Similarly, the pressure control valves 34, 36 and 38 comprise pilot-operated, three-port switching control valves 42, 44 and 46 corresponding to the valve 40, flow lines 60, 62 and 64 corresponding to the flow line 50, fixed flow restrictor 66, 68 and 70 corresponding to the flow restrictor 52, and variable flow restrictors 72, 74 and 76 corresponding to the flow restrictor 54, respectively. The variable flow restrictors 72, 74 and 76 have solenoids 78, 80 and 82, respectively, corresponding to the solenoid 58.

The switching control valves 42, 44 and 46 have the same construction as the switching valve 40, and have their respective ports R connected to a low pressure flow line 48FL for front left vehicle wheel, a low pressure flow line 48RR for rear right vehicle wheel, and a low pressure flow line 48RL for rear left vehicle wheel, respectively, and the ports A connected to connecting flow lines 84, 86 and 88, respectively. The switching valves 42, 44 and 46 are spool type valves adapted to take in as pilot pressures the pressures Pp within the associated flow lines 60, 62 and 64 between the associated fixed and the variable flow restrictors and the pressures Pa within the associated flow lines 84, 86 and 88, and to be shifted to the first switching positions 42a, 44a and 46a, respectively, wherein they fluidly communicate the ports P and A with each other when the pressures Pp are substantially higher than the pressures Pa; the second switching positions 42b, 44b and 46b wherein they shut the communications among the all the ports when the pressures Pp and Pa are substantially equal to each other; and the third switching positions 42c, 44c and 46c wherein they fluidly communicate the ports R and A with each other when the pressures Pp are substantially lower than the pressures Pa.

As shown schematically in FIG. 1, the actuators 1FR, 1FL, 1RR and 1RL include cylinders, 106FR, 106FL, 106RR and 106RL defining the working fluid chambers 2FR, 2FL, 2RR and 2RL and pistons 108FR, 108FL, 108RR and 108RL, respectively, which are reciprocally inserted into the associated cylinders. While in the embodiment shown, the actuators are located between a vehicle body, not shown, and associated suspension arms, also not shown, with each cylinder being coupled to the associated suspension arm and the upper extremity of the rod portion of each piston being coupled to the vehicle body, each cylinder may be coupled to the vehicle body and each piston may be coupled the associated suspension arm. Drain flow lines 110, 112, 114 and 116 are fluidly connected to the cylinders 106FR, 106FL, 106RR and 106RL, respectively, of the actuators. The other ends of the drain lines 110, 112, 114 and 116 are connected with a drain flow line 118, which is in turn connected with the reserve tank 4 by way of a filter 120 so that the oil leaking from the working fluid chambers may be returned into the tank.

Connected to the working fluid chamber 2FR, 2FL, 2RR and 2RL are accumulators 132, 134, 136 and 138, respectively, serving as hydropneumatic springs by way of flow restrictors 124, 126, 128 and 130, respectively. The pistons 108FR, 108FL, 108RR and 108RL have therein flow lines 140FR, 140FL, 140RR and 140RL, respectively. These flow lines fluidly connect the associated flow lines 56, 84, 86 and 88 and the associated working fluid chamber 2FR, 2FL, 2RR and 2RL with each other, and have therein filters 142FR, 142FL, 142RR and 142RL, respectively. At the locations adjacent to the actuators 1FR, 1FL, 1RR and 1RL are installed vehicle height sensors 144FR, 144FL, 144RR and 144RL, respectively, which detect the vehicle heights at the locations corresponding to the associated vehicle wheels.

The connecting flow lines 56, 84, 86 and 88 have therein pilot-operated cut-off valves 150, 152, 154 and 156, respectively, which are each adapted to maintain a closed position; whenever the pressure difference between the pressure within the respective high pressure flow line 18FR, 18FL, 18RR and 18RL upstream of the associated pressure control valves 40, 42, 44 and 46, and the pressure within the drain flow line 110, 112, 114 and 116, is not greater than a predetermined valve, and to variably open as the pressure difference exceeds in the range where the differences exceed the predetermined value. The flow lines 56, 84, 86 and 88 are connected between the associated pressure control valves and the cut-off valves with the flow lines 50, 60, 62 and 64 in the pressure control valves on the downstream side of the associated variable flow restrictors by flow lines 158, 160, 162 and 164, respectively. The flow lines 158, 160, 162 and 164 have therein relief valves 166, 168, 170 and 172, respectively, which are each adapted to take in as their respective pilot pressure, the pressure within the respective associated flow lines 158, 160, 162 and 164 upstream thereof, i.e., on the side of the associated connecting flow lines, and to open when the respective pilot pressure exceeds a respective predetermined value to thereby conduct some oil within the connecting flow lines to the flow lines 50, 60, 62 and 64.

As will be realized, the cut-off valves 150, 152, 154 and 156 may be adapted to retain their closed positions whenever the respective difference between the pressure within the respective high pressure flow lines 18FR, 18FL, 18RR and 18RL and the atmospheric pressure is not greater than a predetermined value. While in the embodiment shown each cut-off valve is provided between the associated pressure control valve and the associated actuator, it may be incorporated on the opposite side from the actuator relative to the pressure control valve.

The flow lines 48FR and 48FL are connected at their other ends with one end of a low pressure flow line 48F for the front vehicle wheels, while the flow lines 48RR and 48RL are connected at their other ends with one end of a low pressure flow lines 48R for the rear vehicle wheels. The flow lines 48F and 48R are connected at their other ends with one end of a low pressure flow line 48. The flow line 48 has therein an oil cooler 174 and is connected at the other end with the reserve tank 4 by way of a filter 176. The high pressure flow line 18 is fluidly connected at a position between the check valve 20 and the attenuator 22 to the low pressure flow line 48 by a flow line 178. The flow line 178 has therein a relief valve 180 which is adapted to open when its pilot pressure is more than a predetermined value.

The high pressure flow line 18R and the low pressure flow line 48R are connected with each other by a flow line 188 which has therein a filter 182, a flow restrictor 184 and a normally open electromagnetic on-off valve 186 including a solenoid 190 for variably adjusting the valve opening. The on-off valve 186 is adapted to open when its solenoid 190 is energized and to control the flow rate of the oil flowing therethrough when the energizing electric current is adjusted. The high pressure flow line 18R and the low pressure flow line 48R are additionally connected to each other by a flow line 194 which has therein a pilot-operated on-off valve 192. The on-off valve 192 is adapted to take in as pilot pressure, the pressure on each side of the flow restrictor 184 and to remain in its closed position 192a when no substantial pressure difference exists between the pressure on each side of the flow restrictor 184 and to be switched over to its open position 192b when the pressure on the side of the high pressure flow line 18R relative to the flow restrictor 184 is substantially higher than the pressure on the side of the low pressure flow line. Thus, the flow restrictor 184, the electromagnetic on-off valve 186 and the on-off valve 192 cooperate with each other to define a bypass valve 196 which selectively communicates the high pressure flow line 18R and the low pressure flow line 48R with each other, and controls the flow rate of the oil flowing from the high pressure flow line to the low pressure flow line.

Further in the embodiment shown, a pressure sensor 107 is connected to the high pressure flow line 18R for detecting the oil pressure Ps within the flow line and similarly a pressure sensor 198 is connected to the low pressure flow line 48R for detecting the oil pressure Pd within the flow line. Pressure sensors 199FR, 199RL, 199RR and 199RL are connected to the connecting flow lines 56, 84, 86 and 88 for detecting the oil pressure within the working fluid chambers 2FR, 2RL, 2RR and 2RL, respectively. A temperature sensor 195 is provided in the reserve tank 4 for detecting the temperature T of the oil within the tank. Compression coil springs 200FR, 200RL, 200RR and 200RL serving as suspension spring are interposed between upper sheets attached to the rod portions of the pistons 108FR, 108RL, 108RR and 108RL incorporated in the actuators and lower sheets secured to the cylinders 106FR, 106RL, 106RR and 106RL, respectively.

Figure 2:
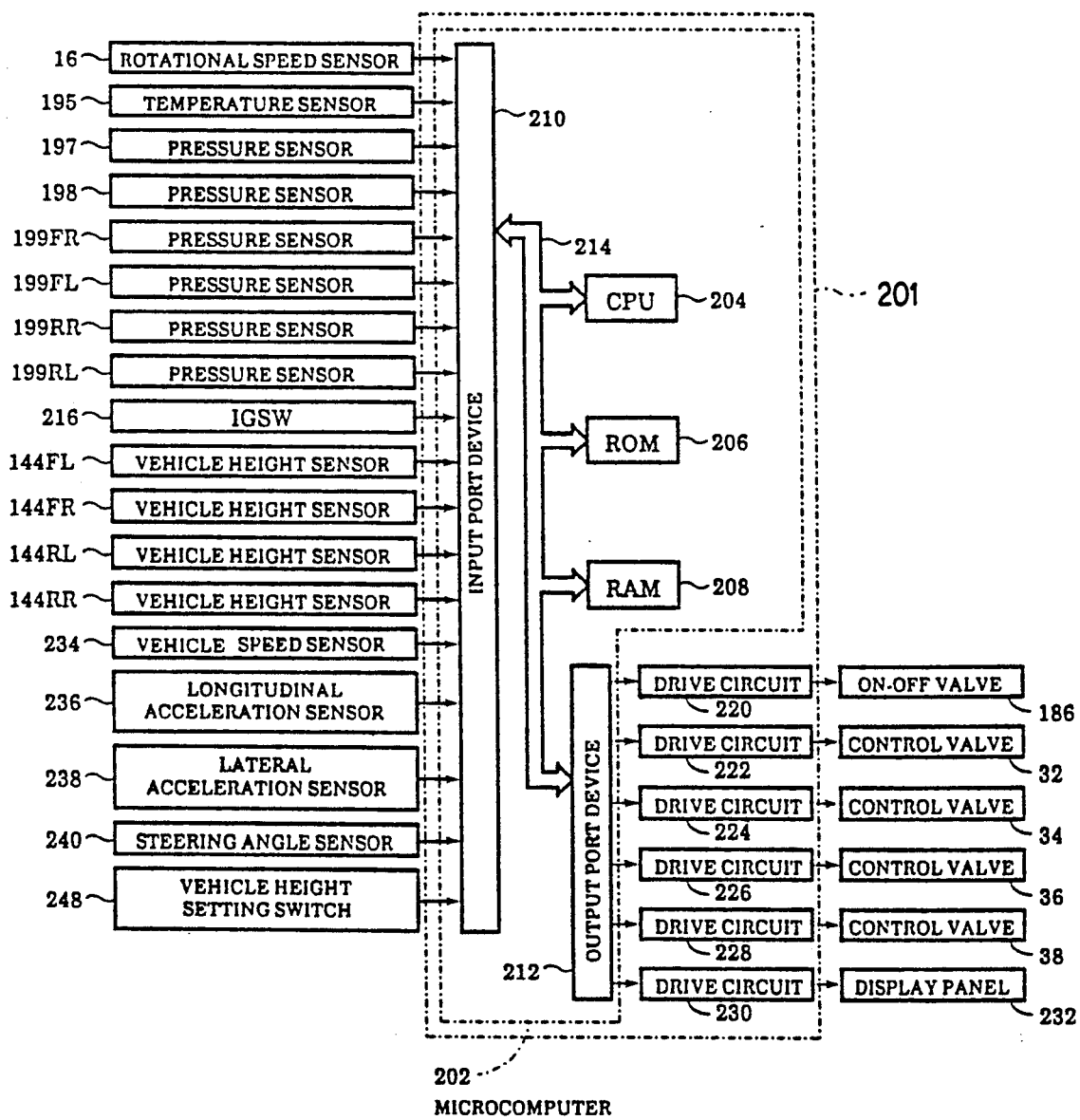
FIG. 2 is a block diagram showing an electric control device of the embodiment shown in FIG. 1.

The electromagnetic on-off valve 186 and the pressure control valves 32, 34, 36 and 38 are controlled by an electric control device 201 shown in FIG. 2. The electric control device 201 includes a microcomputer 202. The microcomputer 202 may, as shown in FIG. 2, be of conventional construction having a (CPU) central processing unit 204, a (ROM) read only memory 206, a (RAM) random access memory 208, an input port device 210, and an output port device 212, all of these being linked with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure flow lines from the pressure sensor 197 and 198, respectively, signals indicative of the pressures Pi (where "i" is "1" for the front left wheel, "2" for the front right wheel, "3" for the rear left wheel, and "b 4" for the rear right wheel) within the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) at locations corresponding to the front left wheel, the front right wheel, the rear left wheel, and the rear right wheel from the vehicle height sensors 144FL, 144FR, 144RL and 144RR, respectively.

Additionally the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle $\theta$ from a steering angle sensor 240, and a signal indicative of whether the mode for controlling the vehicle height set by a vehicle height setting switch 248 is a high mode or a normal mode. The switch 248 is provided in the cabin to be operated by a driver or a passenger according to his or her taste.

The input port device 210 processes the signals input thereinto a predetermined manner and, under the control of the CPU 204 which is based upon the program stored in the ROM 206, outputs the processed signals to the CPU and the RAM 208. The ROM 206 stores the control flows shown in FIG. 3 and FIGS. 6A through 6C and the maps shown in FIG. 4 and 5 and FIGS. 7 through 17. The output port device 212, under the control of the CPU 204, outputs a control signal via a drive circuit 220 to the electromagnetic on-off valve 186 and control signals via drive circuits 222, 224, 226 and 228 to the pressure control valves 32, 34, 36 and 38, to be more exact, to the solenoids 58, 78, 80 and 82 in the variable flow restrictors 54, 72, 74 and 76, respectively, and a control signal via a drive circuit 230 to a display panel 232.

Figure 3:
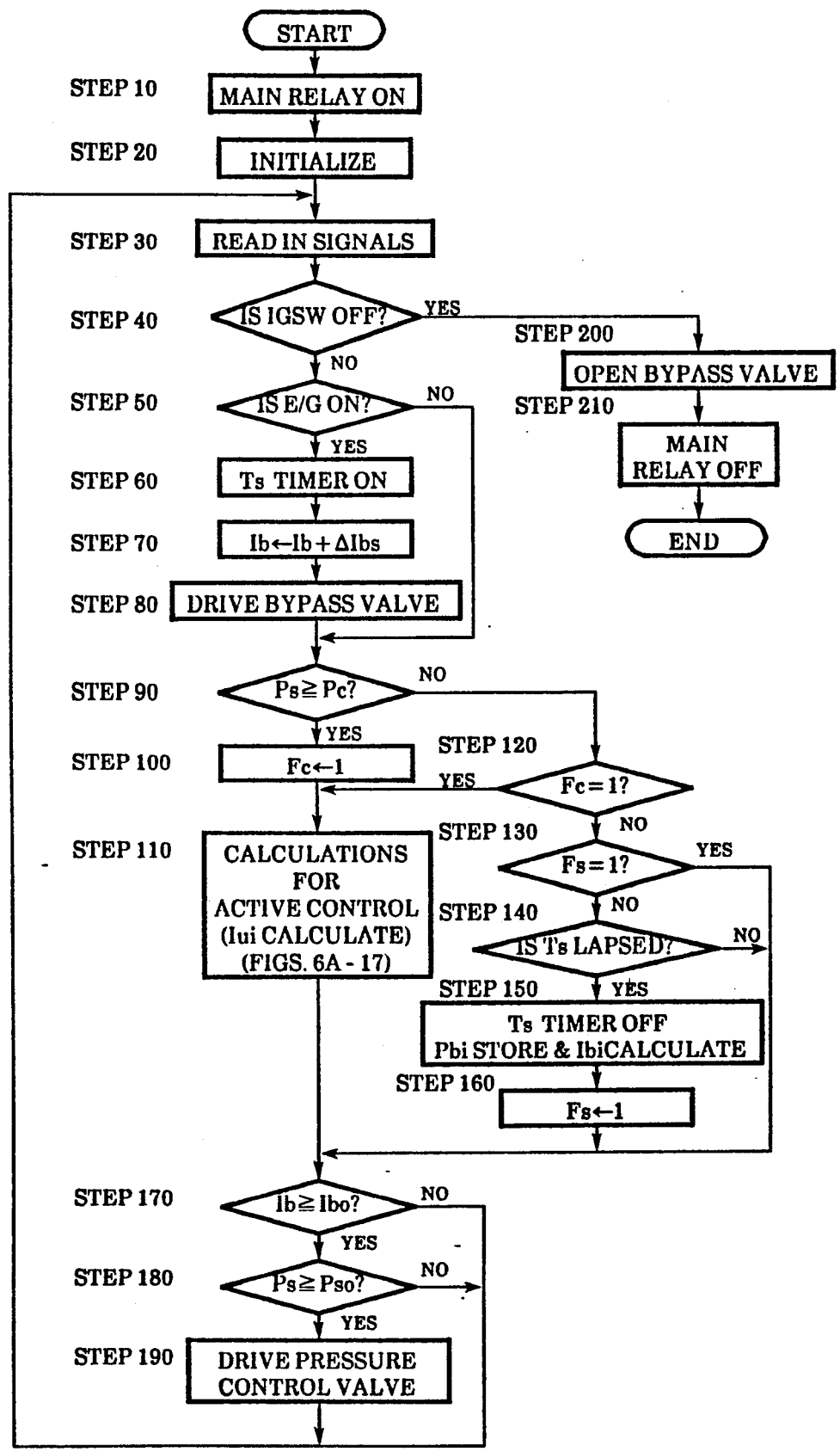
FIG. 3 is a flow chart showing a control flow of a cyclical program carried out by the electric control device shown in FIG. 2.

Referring now to the flow chart shown in FIG. 3, the operation of the embodiment is explained.

In this connection, it is to be noted that the routine of the control flow shown in FIG. 3 is initiated when the ignition switch 216 is turned on. It should also be noted that in the flow chart shown in FIG. 3, a flag Fc relates to whether or not the pressure Ps of the oil within the high pressure flow has exceeded a threshold pressure Pc above which the cut-off valves 152, 150, 156 and 154 are completely opened and one means that the pressure Ps has exceeded the pressure Pc, and a flag Fs is related to whether or not standby pressures Pbi (i=1, 2, 3 and 4) referred to later have been set for the pressure control valves 34, 32, 38 and 36, and one means that the standby pressures have been set.

In the first step 10, a main relay not shown in the figures is turned on, and then the flow of control passes next to the step 20.

In the step 20, the RAM 208 is cleared of all the information stored therein and all the flags are reset to zero, and then the flow of control passes to the next step 30.

In the step 30, signal indicative of the rotational speed N of the engine 14 detected by the rotational speed sensor 16, the signal indicative of the temperature T of the oil detected by the temperature sensor 195, signals indicative of the pressures Ps and Pd within the high pressure and the low pressure flow line detected by the pressure sensors 197 and 198, respectively, the signals indicative of the pressures Pi within the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle $\theta$ detected by the steering angle sensor 240, and the signal indicative of whether the mode for controlling the vehicle height set by the vehicle height setting switch 248 is the high mode or the normal mode are read in, and then the flow of control passes next to the step 40.

In the step 40, a decision is made as to whether or not the ignition switch is off. If a decision is made that the ignition switch is off, then the flow of control is transferred to the step 200, and if a decision is made that the ignition switch is on, then the flow of control passes next to the step 50.

In the step 50, a decision is made as to whether or not the engine is running by determining whether or not the rotational speed N of the engine which was detected by the rotational speed sensor 16 and read in the step 30 is more than a predetermined value. If a decision is made that the engine is not running, then the flow of control is transferred to the step 90, and if a decision is made that the engine is running, then the flow of control passes next to the step 60.

It is to be understood that the decision as to whether or not the engine is running may be made by, for example, determining whether or not the voltage of the electricity generated by an alternator, not shown, which is driven by the engine is higher than a predetermined value.

In the step 60, a timer is started which counts the period of time Ts between the time point when the engine is started and the time point when the standby pressures Pbi are set for the pressure control valves 34, 32, 38 and 36 in the step 150 referred to later, and then the flow of control passes next to the step 70. In the event, however, where the timer has already been operated, it continues to count.

Figure 4:
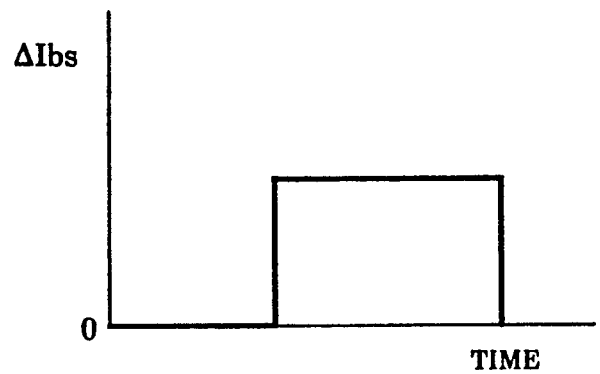
FIG. 4 is a graph showing the map utilized in calculating the electric current Ib which is supplied to the bypass valve at the stage when the active suspension system is started.
Figure 5:
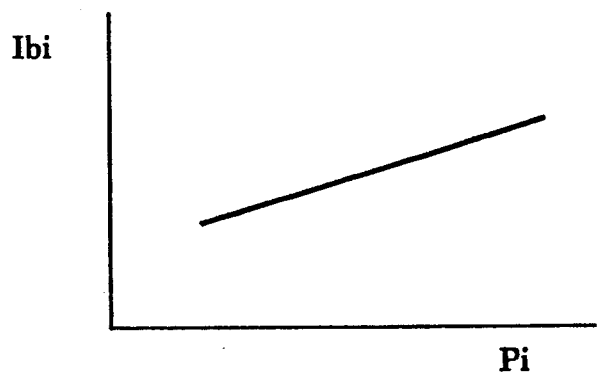
FIG. 5 is a graph showing the relationship between the pressures $P_i$ within the working fluid chambers in the actuators and the electric currents $I_{bi}$ supplied to the pressure control valves.
Figure 6A:
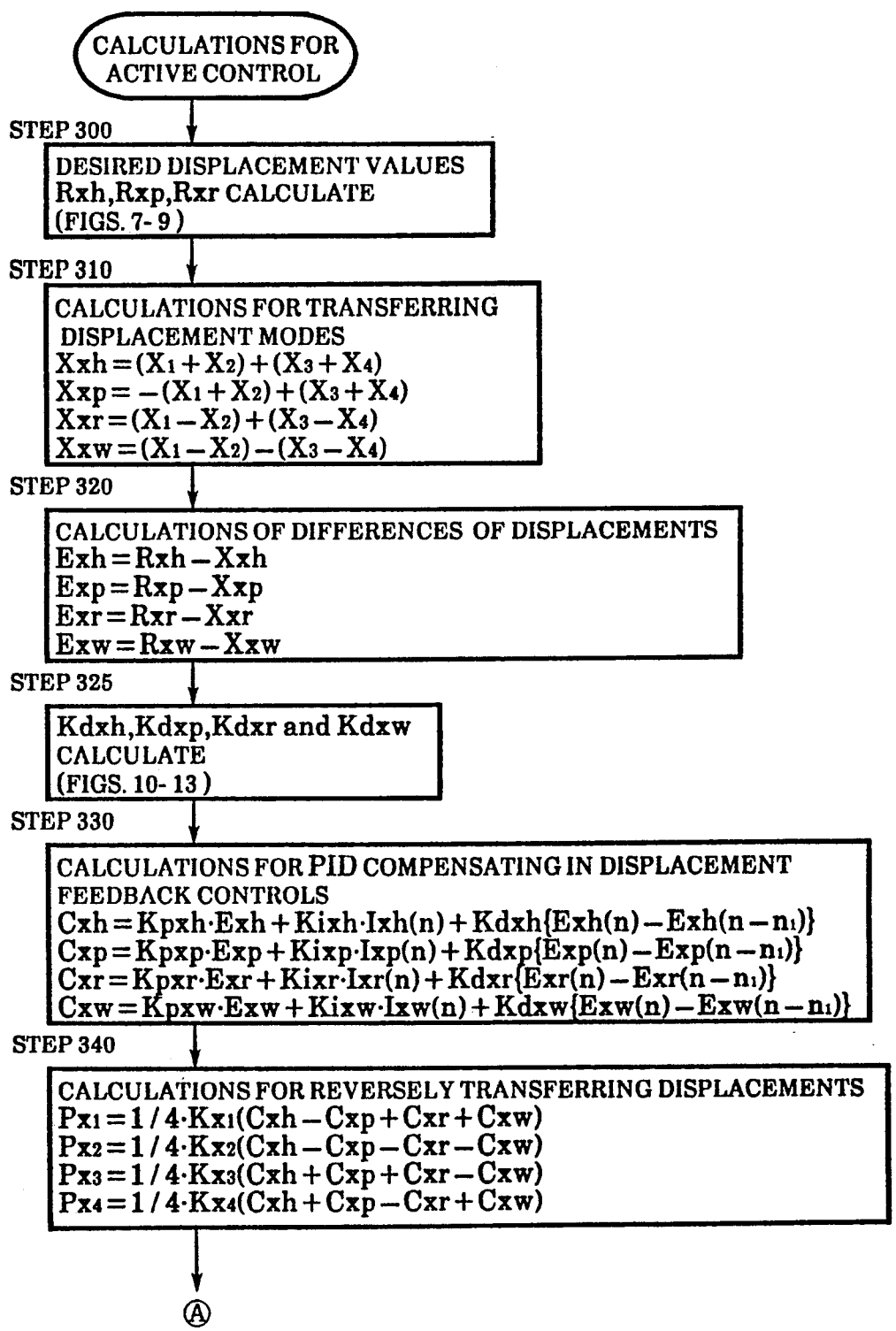
Figure 6C:
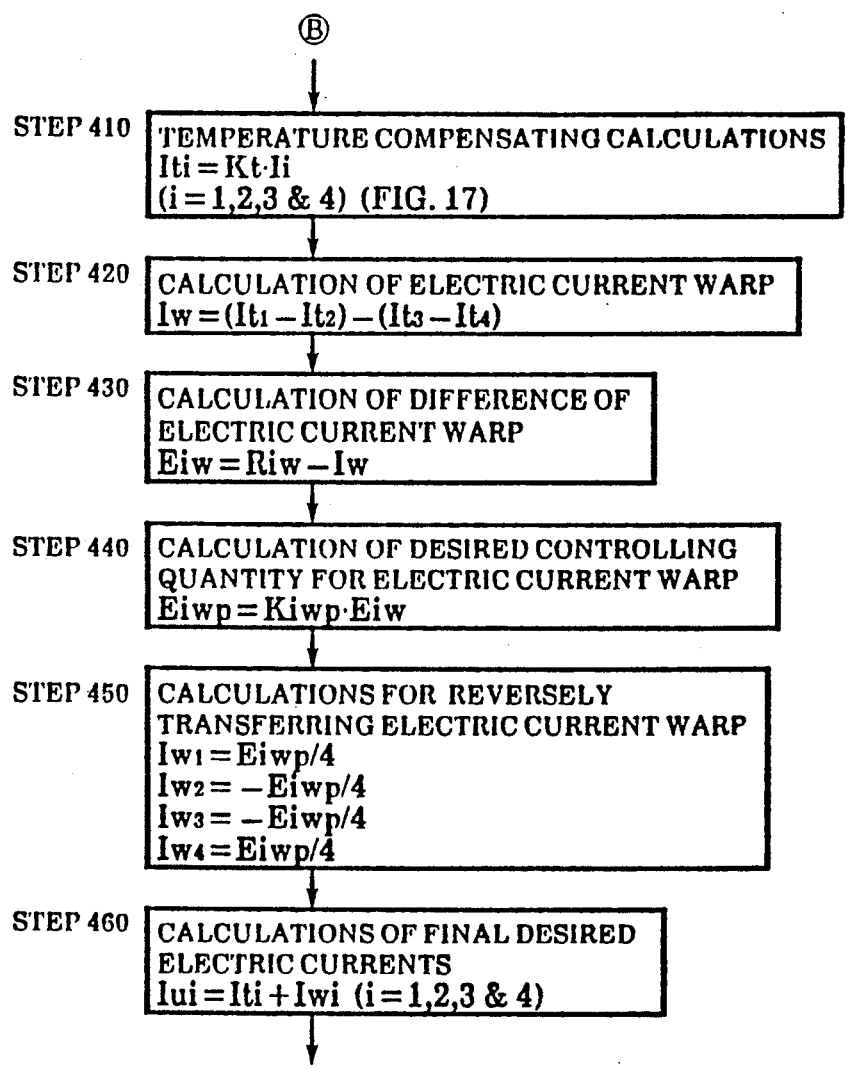

In the step 70, electric current Ib which is supplied to the solenoid 190 within the electromagnetic on-off valve 186 included in the by-pass valve 196 is calculated based upon the map stored in ROM 206 which corresponds to the graph shown in FIG. 4 according to the following equation, and then the flow of control passes next to the step 80.

$$Ib = Ib + \Delta Ibs$$

In the step 80, the electric current Ib calculated in the step 70 is supplied to the solenoid 190 in the electromagnetic on-off valve 186 to shift the by-pass valve 196 toward its fully closed position, and then the flow of control proceeds to the next step 90.

In the step 90, a decision is made as to whether or not the pressure Ps within the high pressure flow line is equal to or more than the threshold value Pc. If a decision is made that Ps is not equal to or is not higher than Pc, then the flow of control is transferred to the step 120, and if a decision is made that Ps is equal to or higher than Pc, then the flow of control passes next to the step 100.

In the step 100, the flap Fc is set to one, and next the flow of control passes to the step 110.

In the step 110, as will be described in detail referring to FIGS. 6A through 6C and FIGS. 7 through 17, in order to control the comfortability of the vehicle and the attitude of the vehicle body, the calculations for the active control are performed based upon the data read in the step 30 to calculate the electric currents Iui supplied to the solenoid 78, 58, 82 and 80 incorporated in the variable restrictors flow 72, 54, 76 and 74 in the pressure control valves, and then the flow of control proceeds to the next step 170.

In the step 120, a decision is made as to whether or not the flag Fc is one. If a decision is made that the flag Fc is one, i.e., the pressure Ps of the oil within the high pressure flow line has been decreased to a level lower than the threshold pressure Pc after it was increased to a level equal to or higher than the threshold value, then the flow of control passes to the step 110, and if a decision is made that the flag Fc is not one, i.e., the pressure Ps has not yet been increased to a level equal to or higher than the threshold pressure Pc, then the flow of control passes next to the step 130.

In the step 130, a decision is made as to whether or not the flag Fs is one. If a decision is made that the flag Fs is one, then the flow of control passes to the step 170, and if a decision is made that the flag Fs is not one, then the flow of control passes next to the step 140.

In the step 140, a decision is made as to whether or not the time Ts has elapsed. If a decision is made that the time Ts has not yet elapsed, then the flow of control passes to the step 170, and if a decision is made that the time Ts has elapsed, then the flow of control passes next to the step 150.

In the step 150, the Ts timer is stopped, and the values of the electric currents Ibi (i=1, 2, 3 and 4) are calculated which are supplied to the solenoids 78, 58, 82 and 80 incorporated within the variable flow restrictors 72, 54, 76 and 74 in the pressure control valves 34, 32, 38 and 36 so that the pressures within the connecting flow lines 84, 56, 88 and 86 between the associated pressure control valves and the associated cut-off valves may be controlled to the respective standby pressures Pbi, i.e., the pressures which are substantially equal to the pressures Pi within the working fluid chambers 2FL, 2FR, 2RL and 2RR that are detected by the associated pressure sensors, and then the flow of control passes next to the step 160.

In the step 160, the flag Fs is set to one, and then the flow of control is transferred to the step 170.

In the step 170, a decision is made as to whether or not the electric current Ib calculated in the step 70 is not less than a reference value Ibo. If a decision is made that the current Ib is less than Ibo, then the flow of control is returned to the step 30, and if a decision is made that the current Ib is not less than Ibo, then the flow of control passes next to the step 180.

In the step 180, a decision is made as to whether or not the pressure Ps within the high pressure flow line read in the step 30 is not less than a reference value Pso which is lower than the threshold value Pc. If a decision is made that Ps is less than Pso, then the flow of control is returned to the step 30, and if a decision is made that Ps is not less than Pso, then the flow of control passes next to the step 190.

In the step 190, the electric currents Ibi calculated in the step 150 or the electric currents Iui calculated in the step 110 are supplied to the solenoid 78, 58, 82 and 80 incorporated in the variable flow restrictions included in the associated pressure control valves so that the valves are driven to adjust the pressures within the working fluid chambers in the associated actuators, and then the flow of control is returned to the step 30, the steps 30 through 190 being repeated.

In the step 200, the supply of the electric current to the solenoid 190 in the electromagnetic on-off valve 186 is stopped to open the by-pass valve 196, and then the flow of control passes next to the step 210.

In the step 210, the main relay is turned off to finish the control flow show in FIG. 3 and to stop supplying electricity to the electric control device 200 shown in FIG. 2.

It is to be noted that the pressure control conducted by the by-pass valve when the system is started does not form a principal part of the present invention, and reference may be made for the details concerning the pressure control to the Japanese Patent Application No. Showa 63-307189 which was filed by an applicant the same as one of the assignees of the present application. It is also to be understood that the pressure control conducted by the by-pass valve when the system is stopped may be carried out in the same manner as in the system described in the Japanese Patent Application Showa 63-307190 which was also filed by an applicant the same as one of the assignees of the present application.

Referring next to the FIGS. 6A through 6C and FIGS. 7 through 17, the calculations for the active control conducted in the above-mentioned step 110 will be explained.

Figure 7:
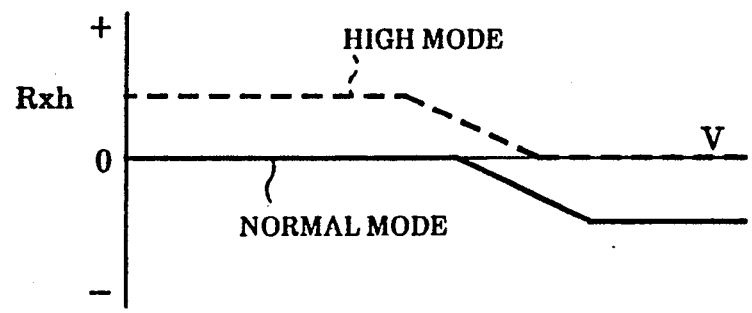
FIG. 7 is a graph showing the relationship between a vehicle speed V and a desired displacement Rxh of heave.
Figure 8:
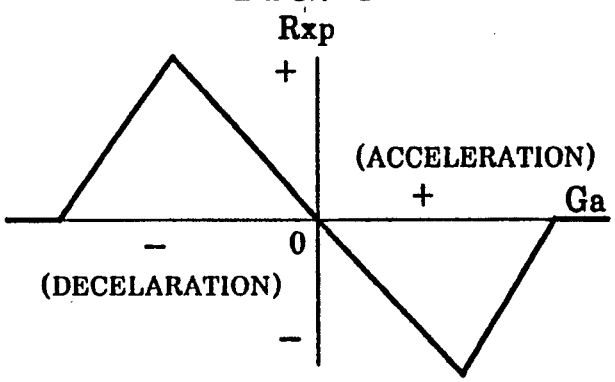
FIG. 8 is a graph showing the relationship between a longitudinal acceleration Ga and a desired displacement Rxp of pitch.
Figure 9:
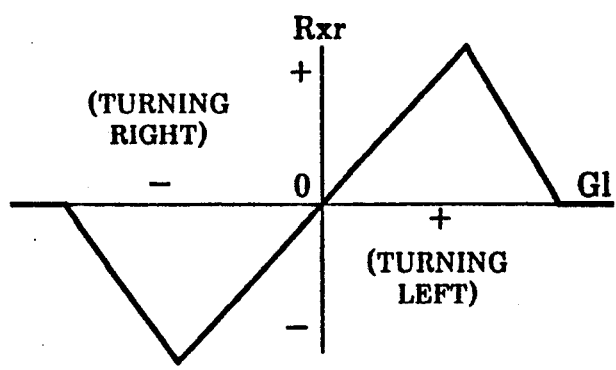
FIG. 9 is a graph showing the relationship between a lateral acceleration Gl and a desired displacement Rxr of roll.
Figure 10:
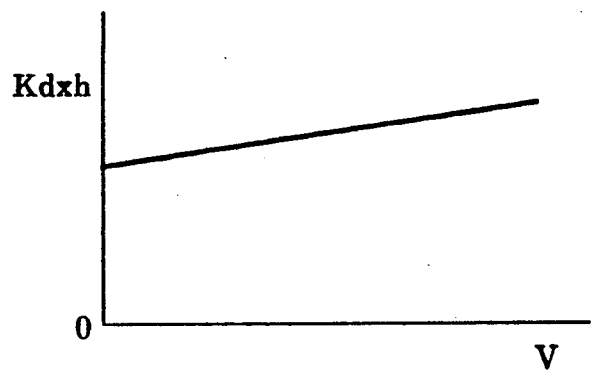
FIGS. 10 through 13 are graphs showing the relationships between a vehicle speed V and gains Kdxh, Kdxp, Kdxr and Kdxw, respectively.
Figure 11:
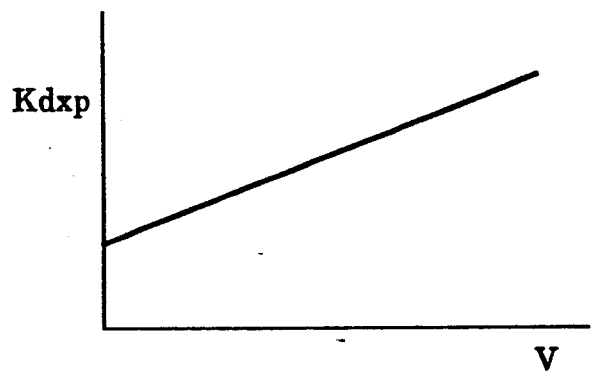
Figure 12:
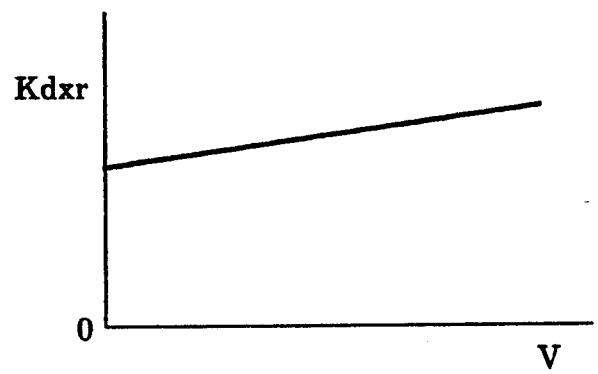
Figure 13:
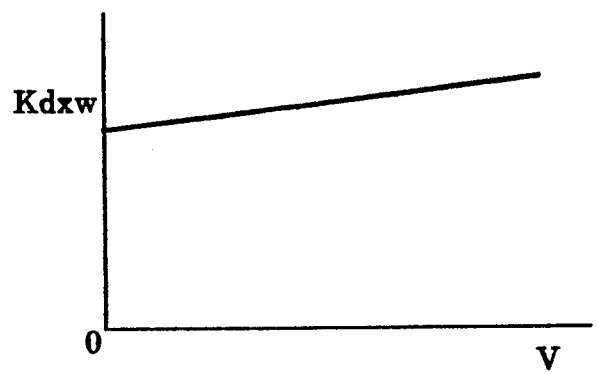

In the step 300, based upon the maps corresponding to the graphs shown in FIGS. 7 through 9, desired displacement values Rxh, Rxp and Rxr of heave, pitch and roll, respectively, for attaining a desired attitude of the vehicle body are calculated, and then the flow of control passes next to the step 310.

It is to be noted that in FIG. 7, the solid line shows a pattern wherein the mode Hset for controlling vehicle heights set by the vehicle height setting switch is the normal mode Hn and the dotted line shows a pattern wherein the mode is the high mode Hh.

In the step 310, based upon the vehicle heights $X_1$, $X_2$, $X_3$ and $X_4$ at the locations corresponding to the front left, front right, rear left, and rear right vehicle wheels read in the step 30, calculations for transferring the vehicle heights into the actual displacement values of heave "Xxh", pitch "Xxp", roll "Xxr" and warp "Xxw" modes are carried out according to the following equations, and thereafter the flow of control passes next to the step 320.

$$Xxh = (X_1 + X_2) + (X_3 + X_4)$$

$$Xxp = -(X_1 + X_2) + (X_3 + X_4)$$

$$Xxr = (X_1 - X_2) + (X_3 - X_4)$$

$$Xxw = (X_1 - X_2) - (X_3 - X_4)$$

In the step 320, the differences between the desired and actual displacements of the respective modes are calculated according to the following equations, and next the flow of control passes to the step 325.

$$Exh = Rxh - Xxh$$

$$Exp = Rxp - Xxp$$

$$Exr = Rxr - Xxr$$

$$Exw = Rxw - Xxw$$

In this connection, Rxw may be zero, or Xxw calculated in the step 310 just after the active suspension system has been started to operate or the average value of Xxws calculated in the last few cycles. If the absolute value of Exw is equal to or less than $W_1$ which is a positive constant, Exw is then set to zero.

In the step 325, based upon the maps corresponding to the graphs shown in FIGS. 10 through 13, the gains for the D terms (differential terms), i.e., the differential constants Kdxh, Kdxp, Kdxr and Kdxw in the equations for the calculations carried out in the next step 330 are calculated, and then the flow of control passes to the next step 330.

In the step 330, calculations for the PID compensations in the displacement feedback controls are conducted according to the following equations, and thereafter the flow of control passes next to the step 340.

$$Cxh = Kpxh.Exh + Kixh.Ixh(n) + Kdxh\{Exh(n) - Exh(n - n_1)\}$$

$$Cxp = Kpxp.Exp + Kixp.Ixp(n) + Kdxp\{Exp(n) - Exp(n - n_1)\}$$

$$Cxr = Kpxr.Exr + Kixr.Ixr(n) + Kdxr\{Exr(n) - Exr(n - n_1)\}$$

$$Cxw = Kpxw.Exw + Kixw.Ixw(n) + Kdxw\{Exw(n) - Exw(n - n_1)\}$$

It should be noted that in the above equations, Ej(n) (J = xh, xp, xr and xw) are the present values of Ej, and Ej(n − $n_1$) are values of Ej obtained $n_1$ cycles before. Assuming Ij(n) and Ij(n—1) are values of Ij of the present cycle and one cycle before, respectively, and Tx is a time constant, they have the following relationship.

$$Ij(n) = Ej(n) + Tx.Ij(n - 1)$$

If the absolute values of Ij exceed Ijmax which are predetermined values, then the Ij are set to Ijmax. Further, the coefficients Kpj, Kij and Kdj (j = xh, xp, xr and xw) are proportional constants, integral constants and differential constants, respectively.

In the step 340, calculations for reversely transferring the displacement modes are carried out according to the following equations, and then the flow of control proceeds to the step 350.

$$Px_1 = \tfrac{1}{4}.Kx_1(Cxh - Cxp + Cxr + Cxw)$$

$$Px_2 = \tfrac{1}{4}.Kx_2(Cxh - Cxp - Cxr - Cxw)$$

$$Px_3 = \tfrac{1}{4}.Kx_3(Cxh + Cxp + Cxr - Cxw)$$

$$Px_4 = \tfrac{1}{4}.Kx_4(Cxh + Cxp - Cxr + Cxw)$$

where $Kx_1$, $Kx_2$, $Kx_3$ and $Kx_4$ are proportional constants.

Figure 14:
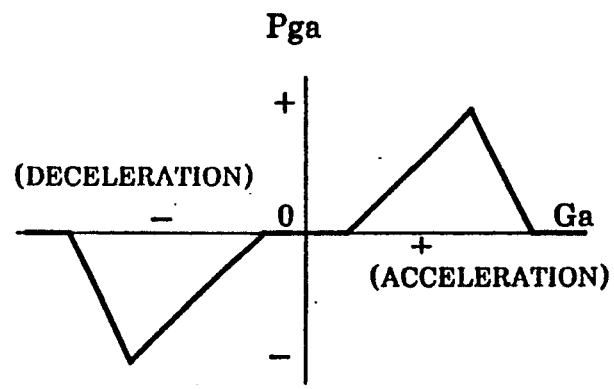
FIG. 14 is a graph showing the relationship between a longitudinal acceleration Ga and a pressure compensating value Pga.
Figure 15:
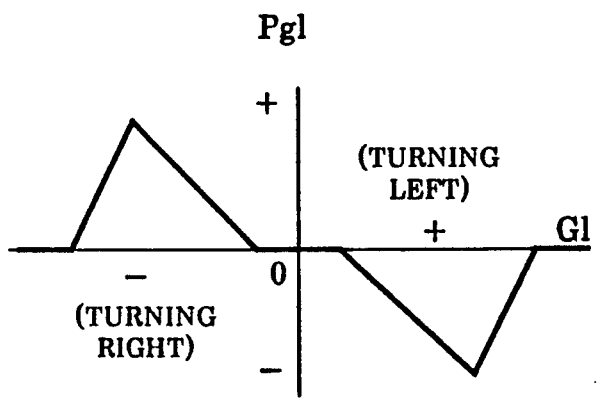
FIG. 15 is a graph showing the relationship between a lateral acceleration Gl and a pressure compensating value Pgl.

In the step 350, based upon the maps corresponding to the graphs shown in FIGS. 14 and 15, pressure compensating values Pga and Pgl in the longitudinal and lateral directions, respectively, are calculated, and then the flow of control passes next to the step 360.

In the step 360, calculations for PD compensations on pitch (Cgp) and roll (Cgr) in acceleration feedback control are conducted according to the following equations, and thereafter the flow of control proceeds to the next step 370.

$$Cgp = Kpgp.Pga + Kdgp\{Pga(n) - Pga(n - n_1)\}$$

$$Cgr = Kpgr.Pgl + Kdgr\{Pgl(n) - Pgl(n - n_1)\}$$

It is to be noted that Pga(n) and Pgl(n) are present Pga and Pgl, respectively, and Pga(n − $n_1$) and Pgl(n − $n_1$) are Pga and Pgl, respectively, at the cycle which is $n_1$ cycles before. Kpgp and Kpgr are proportional constants, while Kdgp and Kdgr are differential constants.

Figure 16:
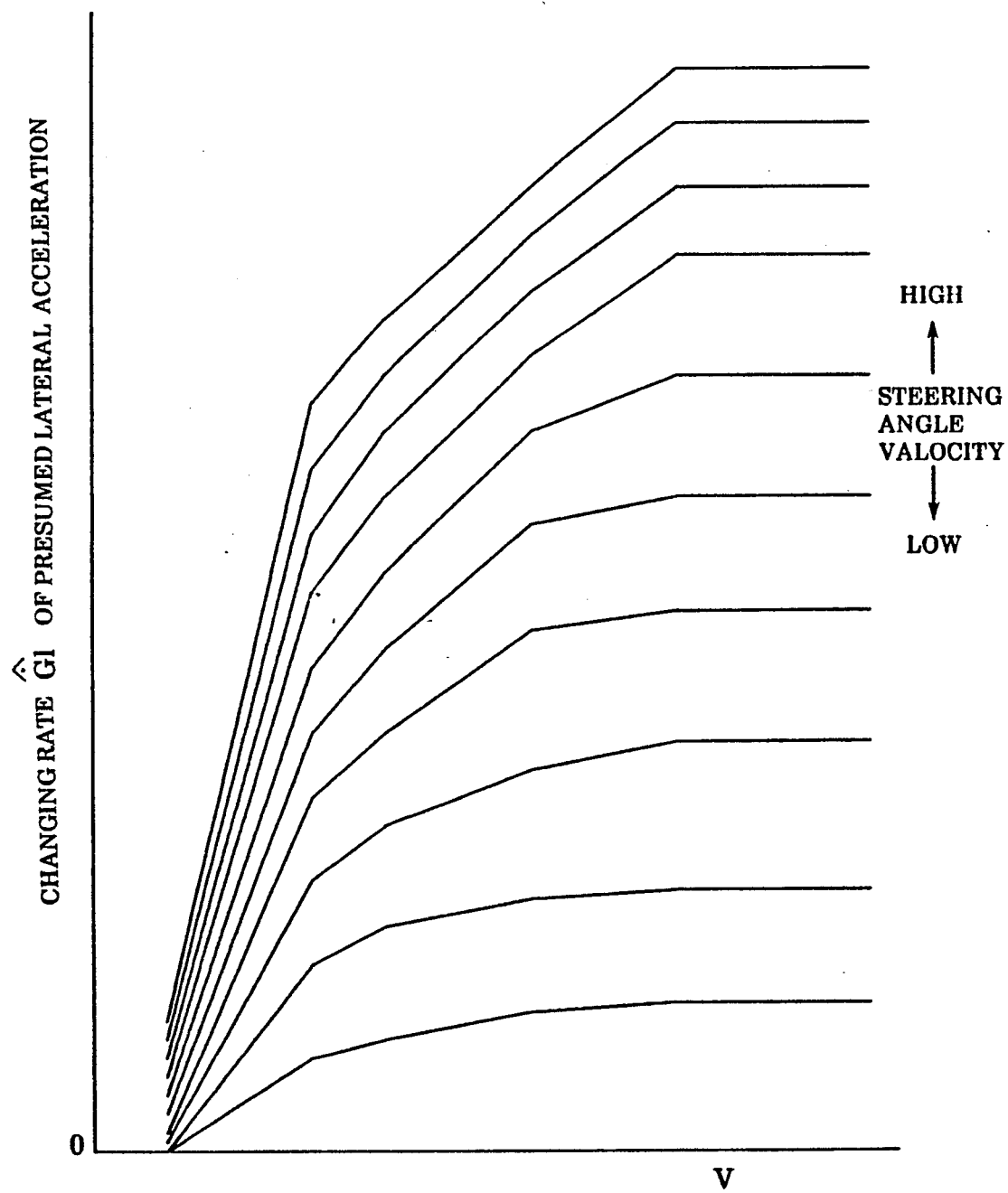
FIG. 16 is a graph showing the relationship between a vehicle speed V, a steering angle velocity and the rate of change Ġl of a presumed lateral acceleration.

In the step 370, letting $\theta'$ represent a steering angle read in the step 30 one cycle before in the flow chart shown in FIG. 3, steering angle velocity $\dot{\theta}$ is calculated according to the following equation:

$$\dot{\theta} = \theta - \theta'$$

and based upon the map corresponding to the graph shown in FIG. 16 and from the steering angle velocity calculated above and a vehicle speed $V$, the rate of change the presumed lateral acceleration "Gl" is calculated, and thereafter the flow of control passes next to the step 380.

In the step 380, calculations for reversely transferring acceleration modes are performed according to the following equations, and next the flow of control proceeds to the step 390.

$$Pg_1 = Kg_1/4.(-Cgp + K_2f.Cgr + K_1f.\dot{Gl})$$

$$Pg_2 = Kg_2/4.(-Cgp - K_2f.Cgr - K_1f.\dot{Gl})$$

$$Pg_3 = Kg_3/4.(Cgp + K_2r.Cgr + K_1r.\dot{Gl})$$

$$Pg_4 = Kg_4/4.(Cgp - K_2r.Cgr - K_1r.\dot{Gl})$$

In the equations $Kg_1$, $Kg_2$, $Kg_3$ and $Kg_4$ are proportional constants, and $K_1f$, $K_1r$, $K_2f$ and $K_2r$ are constant serving as distributing gains between front and rear vehicle wheels.

In the step 390, based upon the pressures Pbi stored in RAM 208 in the step 150 and the calculated values obtained in the steps 340 and 380, desired controlling pressures Pui of the pressure control valves are calculated according to the following equations, and thereafter the flow of control proceeds to the step 400.

$$Pui = Pxi + Pgi + Pbi (i=1, 2, 3 \text{ and } 4)$$

In the step 400, desired electric currents supplied to the pressure control valves are calculated according to the following equations, and then the flow of control passes next to the step 410.

$$I1 = Ku_1 \cdot Pu_1 + Kh(Psr-Ps) - Kl.Pd - \alpha$$

$$I2 = Ku_2 \cdot Pu_2 + Kh(Psr-Ps) - Kl.Pd - \alpha$$

$$I3 = Ku_3 \cdot Pu_3 + Kh(Psr-Ps) - Kl.Pd$$

$$I4 = Ku_4 \cdot Pu_4 + Kh(Psr-Ps) - Kl.Pd$$

It is to be noted that $Ku_1$, $Ku_2$, $Ku_3$, $Ku_4$ are proportional constants for corresponding vehicle wheels; Kh and Kl are compensating coefficients for pressures within the high pressure and the low pressure flow lines, respectively; $\alpha$ is a compensating constant between the front and rear vehicle wheels; and Psr is a standard pressure within the high pressure flow line.

Figure 17:
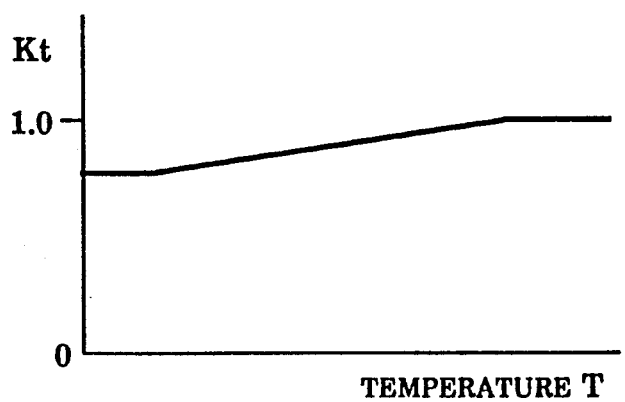
FIG. 17 is a graph showing the relationship between the temperature T of oil and a compensating coefficient Kt.

In the step 410, based upon the temperature T of the oil read in the step 30 and the map corresponding to the graph shown in FIG. 17, a coefficient Kt for compensating for temperature is calculated; the calculations for compensating the desired electric currents for temperature are effected according to the following equations; and then the flow of control passes next to the step 420.

$$Iti = Kt.Ii \ (i=1, 2, 3 \text{ and } 4)$$

In the step 420, an electric current warp, i.e., a warp of the electric current values about the longitudinal axis of the vehicle body, is calculated according to the following equation, and thereafter the flow of control proceeds to the step 430.

$$Iw = (It_1 - It_2) - (It_3 - It_4)$$

In the step 430, letting Riw denote a desired electric current warp, a different of the electric current warp is calculated according to the following equation, and next the flow of control proceeds to the step 440.

$$Eiw = Riw - Iw$$

In the above equation the desired electric current warp Riw may be zero.

In the step 440, letting Kiwp represent a proportional constant, a desired controlling value of the electric current warp is calculated according to the following equation, and then the flow of control passes to the next step 450.

$$Eiwp = Kiwp.Eiw$$

In the step 450, calculations for reversely transferring the electric current warp are carried out according to the following equations, and thereafter the flow of control is transferred to the next step 460.

$$Iw_1 = Eiwp/4$$

$$Iw_2 = -Eiwp/4$$

$$Iw_3 = -Eiwp/4$$

$$Iw_4 = Eiwp/4$$

In the step 460, based upon the values obtained by the calculations conducted in the steps 410 and 450, final desired electric currents Iui supplied to the pressure control valves are calculated according to the following equations, and then the flow of control is transferred to the step 170 shown in FIG. 3.

$$Iui = Iti + Iwi \ (i=1, 2, 3 \text{ and } 4)$$

Thus, according to this embodiment, as shown in FIGS. 10 through 13, since the gains for the D terms in the equations in the step 330 in the vehicle height feedback control are raised as the vehicle speed increases, the effectiveness of suppressing rapid changes in the vehicle heights is increased, enhancing the controllability and stability of the vehicle under higher vehicle speed conditions, and the control parameters of the vehicle height feedback control are decreased under lower vehicle speed conditions, ensuring a better comfortability level for the vehicle.

In the embodiment also, the gains for P terms (proportional terms) and I terms (integral terms) in the equations are not raised but only the gains for D terms are increased as the vehicle speed increases. Therefore, the control parameters of the vehicle height feedback control do not become too high under steady state running conditions where the vehicle heights normally change within smaller ranges, making it possible to avoid the excessive control and the hunting caused thereby from occurring.

Furthermore, according to the embodiment, the feedback control is performed on the vehicle heights at the locations corresponding to the vehicle wheels for the modes of heave, pitch, roll and warp, and the gains for D terms in the feedback control are increased as the vehicle speed increases. Accordingly, it is possible not only to effectively suppress the transitional attitude change, i.e., the roll of the vehicle body during turning as in the active suspension system described in the aforementioned Japanese Utility Model Laying Open Publication No. Showa 62-185608 (1987), but also to reduce the transitional attitude change, i.e., the pitch of the vehicle body which might otherwise occur under acceleration and deceleration conditions.

It is to be understood that while in the above mentioned embodiment, in the step 325 the gains for D terms for all the modes of heave, pitch, roll and warp are calculated so that they may be raised as the vehicle speed increases, only the gains for D terms for pitch and roll or either of them may be increased as the vehicle speed increases.

Although the present invention has been shown and described in detail in terms of particular preferred embodiment, the present invention is not restricted to the embodiment, and it will be seen by those skilled in the relevant art that various modifications may be made without department from the scope of the present invention.

What is claimed:

1. A hydraulic active suspension system for a vehicle having a vehicle body and a plurality of vehicle wheels comprising:
a plurality of actuators each having a working fluid chamber and being provided between said vehicle body and an associated one of said plurality of vehicle wheels, each actuator adapted to increase and decrease vehicle height in response to a pressure within its working fluid chamber;
pressure control means for controlling the pressures within said working fluid chambers;
vehicle speed detecting means for detecting a vehicle speed and generating a vehicle speed signal indicative of the vehicle speed; and
second control means for controlling said pressure control means so that an actual pressure within each said working fluid chamber is biased to a desired pressure within each said working fluid chamber, wherein each said desired pressure is determined by at least a weighted sum of at least one first control parameter corresponding to at least one vehicle attitude difference between at least one actual vehicle attitude detected by a vehicle height detecting means and at least one associated desired vehicle attitude and at least one second control parameter corresponding to the rate of change of said at least one vehicle attitude difference;
wherein said at least one second control parameter is directly proportional to the vehicle speed detected by said vehicle speed detecting means.

2. A hydraulic active suspension system for a vehicle according to claim 1, wherein each said desired pressure is determined by at least the weighted sum of a plurality of attitude control signals, each said attitude control signal determined by the sum of the at least one first control parameter, the at least one second control parameter and at least one third control parameter, wherein the at least one first control parameter is proportional to the at least one vehicle attitude difference between the detected at least one actual vehicle attitude and the associated desired at least one vehicle attitude, the at least one second control parameter is proportional to the at least one differential value of said at least one vehicle attitude difference, and the at least one third control parameter is proportional to the at least one integral value of said at least one vehicle attitude difference, and at least one coefficient for the at least one second control parameter varies directly accordingly to the detected vehicle speed.

3. The hydraulic active suspension system for a vehicle of claim 1, wherein said second control means is adapted to calculate said at least one vehicle attitude difference for at least one of a roll mode, a heave mode, a warp mode and a pitch mode.

4. The hydraulic active suspension system for a vehicle of claim 3 wherein said vehicle height detecting means detects actual vehicle heights at a plurality of locations, each said location corresponding to one of said plurality of vehicle wheels, wherein the at least one actual vehicle mode attitude is determined from the plurality of actual vehicle heights detected by the vehicle height detecting means, wherein $$Xxh = (X1 + X2) + (X3 + X4)$$

$$Xxp = (X3 + X4) - (X1 + X2)$$

$$Xxr = (X1 + X3) - (X2 + X4)$$

$$Xxw = (X1 + X4) - (X2 + X3)$$

where
Xxh is the actual vehicle heave mode altitude;
Xxp is the actual vehicle pitch mode altitude;
Xxr is the actual vehicle roll mode altitude;
Xxw is the actual vehicle warp mode altitude;
X1 is the actual vehicle height determined at the right front wheel location;
X2 is the actual vehicle height determined at the left front wheel location;
X3 is the actual vehicle height determined at the right rear wheel location; and
X4 is the actual vehicle height determined at the left rear wheel location.

5. The hydraulic active suspension system of claim 2, further comprising at least one acceleration detecting means for generating acceleration signals indicative of vehicle accelerations, wherein the at least one associated desired vehicle attitude is determined by the second control means from at least one of said acceleration signals.

6. The hydraulic active suspension system of claim 5, wherein said at least one acceleration detecting means comprises at least one of a lateral acceleration detecting means for generating lateral acceleration signals and a longitudinal acceleration detecting means for generating longitudinal acceleration signals.

7. The hydraulic suspension system of claim 2, wherein the at least one desired associated vehicle attitude is determined by the second control means from the vehicle speed signal.

8. The hydraulic suspension system of claim 2, further comprising a ride characteristic mode selection means for selecting one of a plurality of differing ride characteristics, wherein the at least one desired vehicle attitude is determined by the second control means from the ride characteristic selected by the ride characteristic mode selection means.

9. The hydraulic active suspension system for a vehicle of claim 2, wherein the second control means determines the at least one coefficient of the at least one second control parameter from the vehicle speed signal.

* * * * *